United States Patent [19]
Crockett et al.

[11] Patent Number: 5,656,189
[45] Date of Patent: Aug. 12, 1997

[54] HEATER CONTROLLER FOR ATOMIC FREQUENCY STANDARDS

[75] Inventors: Jeff David Crockett, Fullerton; Donald Alan Watts, Tustin, both of Calif.

[73] Assignee: Efratom Time and Frequency Products, Inc., Irvine, Calif.

[21] Appl. No.: 348,468

[22] Filed: Dec. 2, 1994

[51] Int. Cl.$^6$ .................................................. H05B 1/02
[52] U.S. Cl. ...................... 219/499; 219/501; 219/505; 219/210; 331/1 R; 331/69; 330/289
[58] Field of Search .................................. 219/209, 210, 219/497, 501, 505, 508, 499; 330/259, 289, 270, 290, 75; 331/1 R, 3, 8, 69

[56] References Cited

U.S. PATENT DOCUMENTS

| | | | |
|---|---|---|---|
| 2,975,330 | 3/1961 | Bloom et al. | 315/115 |
| 3,109,960 | 11/1963 | Bell et al. | 315/248 |
| 3,129,389 | 4/1964 | Packard et al. | 331/3 |
| 3,192,472 | 6/1965 | Bender et al. | 324/58.5 |
| 3,382,452 | 5/1968 | Rempel et al. | 331/3 |
| 3,390,350 | 6/1968 | Davidovits et al. | 331/94 |
| 3,403,349 | 9/1968 | Wieder | 330/4.3 |
| 3,513,381 | 5/1970 | Happer, Jr. | 324/0.5 |
| 3,584,292 | 6/1971 | Dehmelt | 324/0.5 |

(List continued on next page.)

FOREIGN PATENT DOCUMENTS

| | | |
|---|---|---|
| 52-19096 | 2/1977 | Japan. |
| 55-107340 A | 8/1980 | Japan. |
| 2067751 | 7/1981 | United Kingdom. |

OTHER PUBLICATIONS

Eltsufin, Stern, Fel, "Compact Rectangular–Cylindrical Cavity for Rubidium Frequency Standard," IEEE Forty-Fifth Annual Symposium on Frequency Control, 1991, pp. 567–571.

Busca et al., "Long–term Frequency Stabilization of the Rb$^{87}$ Maser," 24 IEEE Transactions on Instrumentation and Measurement 291–296 (Dec. 1975).
Matsuda et al. "Signal Intensity Characteristics of the $^{87}$Rb Double Resonance Due to the Pumping Light", Japanese J. of Appl. Physics, vol. 16, No. 3, Mar. 1977, pp. 391–396.
Kuramochi et al., "Composite–type $^{87}$Rb Optical–Pumping Light Source", Optics Letters, vol. 6, No. 2, Feb., 1981, pp. 73–75.
Mathur et al., "Light Shifts in the Alkali Atoms" Physical Review, vol. 171, No. 1, 5 Jul. 1968, pp. 11–19.
Audoin et al., "Atomic Frequency Standards and Clocks", J. of Physics E. Scientific Instruments, vol. 9, No. 9 (1976.09), pp. 697–720.

Primary Examiner—Mark H. Paschall
Attorney, Agent, or Firm—Brinks Hofer Gilson & Lione

[57] ABSTRACT

A heater controller for an atomic frequency standard provides accurate and stable temperature control for an assembly, such as a lamp assembly, by regulating a current flow through a heating device so as to maintain a substantially constant heating power output during start-up and by reducing the DC temperature errors of the system during normal operation. The heater controller includes an integrating amplifier which generates an amplified temperature signal based on the temperature of the lamp assembly. The heater controller further includes a device for receiving the amplified signal from the integrating amplifier and establishing a control voltage having an upper limit based on a voltage of the heater power supply. An attenuator is provided for attenuating an output signal from the receiving device by an attenuation factor sufficient to offset a substantial portion of the amplified temperature signal, as required for thermal control loop stability at a frequency above the gain transition frequency, wherein the attenuation factor permits an increase in the gain of the integrating amplifier above the gain transition frequency, and wherein the increase in gain is achieved by decreasing the value of the input resistor of the integrating amplifier. In turn, the reduction in value of the input resistor results in a decrease in an amount of DC temperature error generated by the lamp assembly, wherein the temperature error is a result of leakage currents and offset currents flowing in the integrating amplifier.

22 Claims, 4 Drawing Sheets

U.S. PATENT DOCUMENTS

| | | | |
|---|---|---|---|
| 3,798,565 | 3/1974 | Jechart | 331/94 |
| 3,815,048 | 6/1974 | Hamlet | 331/109 |
| 3,873,884 | 3/1975 | Gabriel | 315/267 |
| 3,903,481 | 9/1975 | Jechart | 331/3 |
| 4,043,306 | 8/1977 | Barber et al. | 330/30 D |
| 4,095,142 | 6/1978 | Murayama et al. | 315/248 |
| 4,097,853 | 6/1978 | Francis, Jr. | 340/258 A |
| 4,314,208 | 2/1982 | Munday | 331/1 A |
| 4,349,798 | 9/1982 | Podell et al. | 333/230 |
| 4,405,905 | 9/1983 | Busca et al. | 331/94.1 |
| 4,434,406 | 2/1984 | Fowks | 331/3 |
| 4,446,446 | 5/1984 | Fowks | 331/3 |
| 4,462,006 | 7/1984 | Fowks | 331/3 |
| 4,476,445 | 10/1984 | Riley, Jr. | 331/3 |
| 4,479,096 | 10/1984 | Fowks | 331/3 |
| 4,485,333 | 11/1984 | Goldberg | 315/149 |
| 4,494,085 | 1/1985 | Goldberg | 331/94.1 |
| 4,495,478 | 1/1985 | Kwon et al. | 333/230 |
| 4,574,249 | 3/1986 | Williams | 330/59 |
| 4,596,029 | 6/1986 | Manueco Santurtun et al. | 330/59 |
| 4,629,887 | 12/1986 | Bernier | 250/251 |
| 4,661,782 | 4/1987 | Weidmann | 331/3 |
| 4,721,890 | 1/1988 | Riley, Jr. | 315/224 |
| 4,899,345 | 2/1990 | Cyr et al. | 372/32 |
| 4,947,137 | 8/1990 | Busca et al. | 331/94.1 |
| 4,968,908 | 11/1990 | Walls | 307/529 |
| 5,101,506 | 3/1992 | Walls | 455/115 |
| 5,172,064 | 12/1992 | Walls | 324/601 |
| 5,327,105 | 7/1994 | Liberman et al. | 331/94.1 |
| 5,331,854 | 7/1994 | Hulsing, II | 73/505 |

SIGNIFIES REFERENCE TO BASEPLATE TEMPERATURE

HEATER CONTROLLER FOR ATOMIC FREQUENCY STANDARDS

FIELD OF THE INVENTION

The present invention relates to atomic frequency standards and more particularly to a heater controller for elements of a physics package of an atomic frequency standard.

BACKGROUND OF THE INVENTION

An atomic frequency standard is a device having a resonant system derived from an atomic or molecular specie experiencing a transition between two or more well-defined energy levels of the atom or molecule. Such a system includes an atomic-controlled oscillator whose frequency is controlled by means of a physics package and associated electronics that are devoted at maintaining the assigned output frequency, typically 5 MHz or 10 MHz, on a very long-term, accurate and stable basis. Such a physics package, frequently referred to as a resonator assembly, typically includes a microwave cavity resonator, a filter cell, an absorption cell, a lamp assembly including a vapor discharge lamp, a photodetector, a temperature control means, and at least one magnetic shield surrounding these components. The general operation of such an atomic frequency standard is well known in the art.

The filter cell, absorption cell, and vapor discharge lamp contain a material having atoms which can be excited to Undergo atomic energy level transitions, such as, for example, rubidium atoms. Typically, an r.f. excitation field is applied to the vapor discharge lamp to produce light. The filter cell contains an isotope of rubidium, such as RB-85, which filters out light with a wave length that will stimulate transition of atoms from a particular energy level to any optically excited energy level. The filtered light is then directed through an absorption cell which contains another isotope of rubidium, such as RB-87, and the filtered light energy absorbed by the RB-87 atoms causes a transition of the atoms from one energy level to another optically excited energy level.

In order for there to be sufficient rubidium atoms available to make the appropriate transitions, a heating device is employed to increase the temperature of the rubidium lamp, absorption cell or filter cell, thereby increasing the vapor pressure in the respective device which in turn increases the number of rubidium atoms in the vapor state. For example, a heater may be operated to increase and maintain the temperature within a resonator assembly to about 70°–80° C. to provide vaporous rubidium, and to increase and maintain the temperature of a lamp assembly at about 110° C.

Rubidium atomic frequency standards require precise temperature control of the lamp assembly. Because of the temperature coefficient of the lamp cell, the thermal control must operate within milli degrees centigrade (0.001° C.) per month to achieve the desired aging performance, and must be kept to a few tenths of a degree centigrade over the ambient temperature extremes to achieve the desired temperature coefficient performance.

Although systems have been invented which attempt to provide the necessary temperature control of the lamp assembly, an improved heater controller for use with an atomic frequency standard is desired.

SUMMARY OF THE INVENTION

The present invention relates to apparatus and methods for regulating the temperature of a physics package assembly used in an atomic frequency standard. The apparatus provides accurate and stable temperature control for assembly elements by controlling the current through a heating device so as to maintain a substantially constant maximum heating power during times when there is a large temperature error signal, such as upon start-up, and by providing reduced heating power with a small temperature error. Furthermore, the DC temperature error of the system that would be due to amplifier bias and offset currents and integrator capacitor leakage currents, particularly at elevated temperatures, is significantly reduced from an amount of DC temperature error which would occur in the absence of the invention.

The apparatus employs a high gain input stage with high temperature sensitivity and low DC temperature error, and an attenuated application of the output of the high gain input stage in control of the heating device to provide low over all system gain and stable operation and to permit desirably higher gain in the input stage of the heater controller that results in reduced capacitance (and a reduction in component mounting space) and a reduced input resistance, both of which reduce the DC temperature error.

A preferred heater controller of the invention includes a heater power supply for supplying DC electrical power and a heating device, such as a field effect transistor, electrically coupled to the power supply and thermally coupled to the lamp assembly so the electrical losses of the heating device heat the lamp assembly. A heater controller having a device, such as a thermistor bridge circuit, generates a temperature signal corresponding to a temperature of the lamp assembly. The temperature signal is supplied to conditioning circuitry. The conditioning circuitry includes an integrating amplifier having an input resistor, a feedback resistor and a feedback capacitor. The integrating amplifier is configured so as to have a first gain at zero Hertz which is very large, e.g. 20,000 to 100,000 and a second gain, such as, for example a gain of between 20 and 40, at a frequency above a gain transition frequency, such as, for example 0.011 Hertz. The second gain is substantially determined by a ratio formed by a resistance of the feedback resistor divided by a resistance of the input resistor plus one (1). Thus, the integrating amplifier generates an amplified temperature signal based on the temperature of the lamp assembly.

The preferred heater controller of the invention further includes a device for receiving the amplified signal from the integrating amplifier and, in preferred embodiments establishes a control voltage having a settable upper limit, such as for example, by establishing a control voltage having an upper limit based on a voltage of the heater power supply. An attenuator is provided for attenuating an output signal from the receiving device by an attenuation factor sufficient to offset a substantial portion of the amplified temperature signal so that the product of the gain of the integrating amplifier multiplied by the attenuation factor is that value, for example, about two or less, as required for the thermal control loop stability of the heater controller at a frequency above the gain transition frequency, wherein the attenuation factor permits an increase in the gain of the integrating amplifier above the gain transition frequency, and wherein the increase in gain is achieved by decreasing the value of the input resistor of the integrating amplifier. In turn, the reduction in value of the input resistor results in a decrease in DC temperature error generated in the lamp assembly, the DC temperature error being the result of leakage currents of the integrating capacitor and offset currents flowing in the integrating amplifier.

In a preferred heater controller of the invention, the receiving device includes circuitry for compensating for voltage variations in the heater power supply voltage applied to the heating device by generating a clamp voltage based on a voltage generated by the heater power supply. The clamp voltage is used to establish the upper limit of the control voltage, and hence, establishes an upper limit for the power applied to the heating device. The receiving means further includes a voltage follower circuit having an input for receiving the amplified temperature signal and a following output for supplying the control voltage at a voltage level which substantially tracks the voltage of the amplified temperature signal while the voltage follower is not controlled to operate in saturation, and at a maximum voltage substantially equal to the clamp voltage when the voltage follower circuit reaches saturation.

The compensating circuitry includes a compensating amplifier having a first input coupled to the heater power supply and a second input coupled to a reference voltage. The compensating amplifier generates the clamp voltage based on a difference in voltage levels present at the first and second inputs.

The voltage follower circuit includes a control transistor having a collector connected with the output of the compensating amplifier. The compensating amplifier adjusts the collector voltage of the control transistor as the voltage applied to the heating device varies, for example, from a low voltage of about 18 V to and above a high voltage of about 32 V, so that at each value of voltage, the current through the heating device makes a simple straight line approximation to that current required for a constant thermal loss of the heating device as the voltage applied to the heating device varies, through the action of the compensating amplifier clamping transistor and the attenuating device.

In preferred embodiments, the attenuating device includes a pair of series connected resistors coupled between the following output and ground; a buffer op-amp having a non-inverting input coupled between the pair of series resistors, having an inverting input coupled to the heating device, and an output for supplying a signal to control the current flow through the heating device; and a voltage reference circuit resistively coupled to the inverting input of the buffer op-amp, the voltage reference circuit generating a signal having a voltage which overrides a voltage offset of the inputs of the op-amp to permit fuller range of operation of the op-amp.

Other features and advantages of the invention may be determined from the drawings and detailed description of the invention that follows.

DETAILED DESCRIPTION OF PREFERRED EMBODIMENTS

Figure 1:
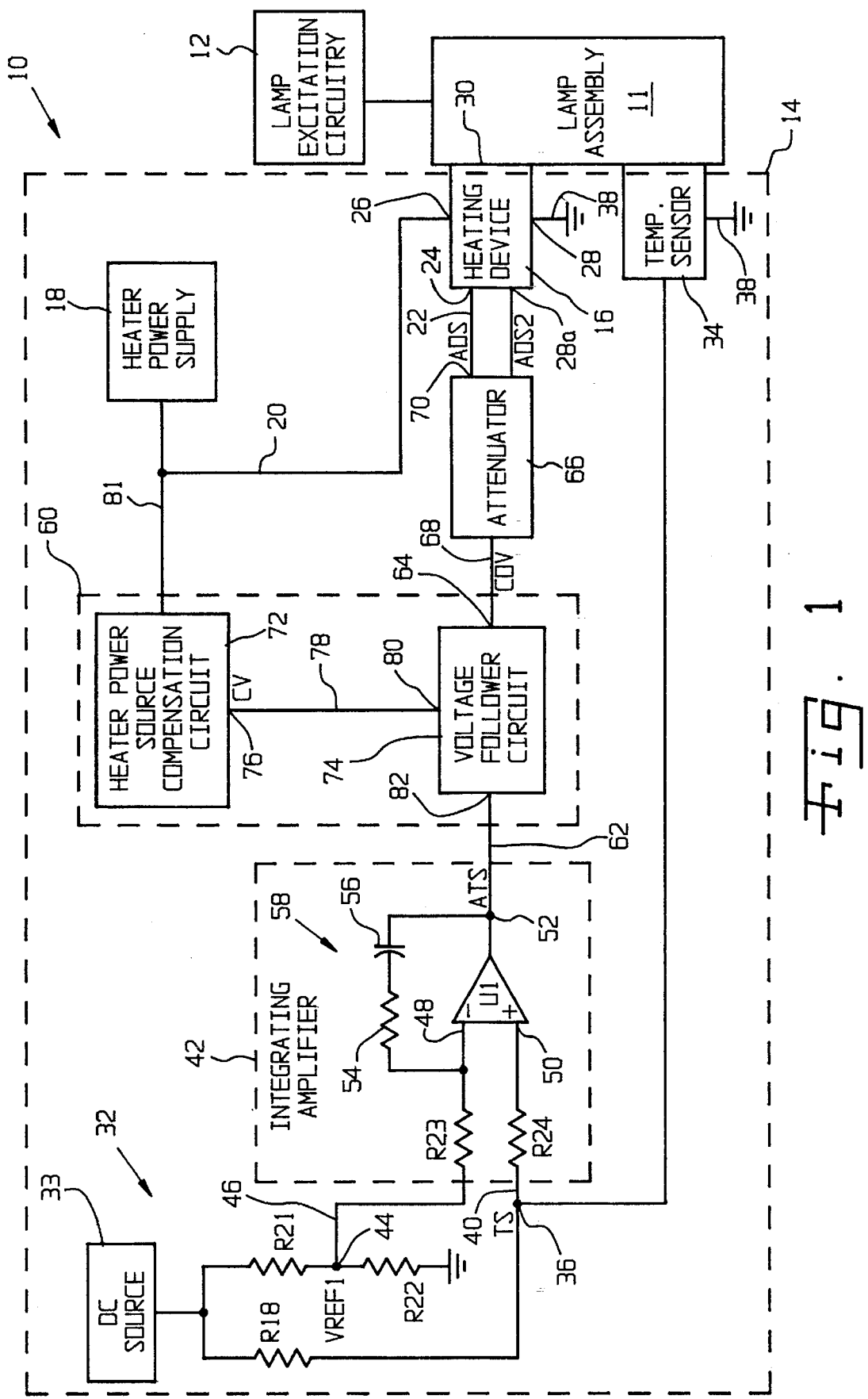
FIG. 1 shows a block diagram of a lamp system of the invention as would be used in an atomic frequency standard.

FIG. 1 shows a block diagram of a lamp system 10 used in an atomic frequency standard. Lamp system 10 includes a lamp assembly 11 which receives excitation signals from a lamp excitation circuit 12 to control the operation of lamp assembly 11 in a known manner. Lamp system 10 further includes a heater controller 14, including a heating device 16, for regulating the temperature of lamp assembly 11. Heater controller 14 provides accurate and stable temperature control for lamp assembly 11.

Although, heater controller 14 is shown and described with reference to lamp assembly 11, heater controller 14 may also be used to provide accurate and stable heating for any of a number of elements in an atomic frequency standard, such as for example, an absorption cell or filter cell containing one or more isotopes of rubidium, or a heated crystal used in a voltage controlled crystal oscillator of the atomic frequency standard. Accordingly, it is not intended for the application of heater controller 14 to be limited to the preferred embodiments shown in FIGS. 1 and 2 and described in more detail below.

When there are large temperature errors, such as at startup, heater controller 14 regulates the current applied to heating device 16 so as to maintain a substantially constant maximum heating power output. As the steady state temperature is approached, the heating power is reduced to a level which will sustain the steady state temperature with a minimal temperature error. Heater controller 14 will then adjust the heating power to compensate for environmental variations, such as baseplate temperature and input heater power supply voltage variations. Further, with the invention the DC temperature error of heater controller 14 due to bias and offset currents of amplifying components, and due to capacitor leakage currents, which typically increase with an increase in temperature, are significantly reduced to provide a minimal temperature error.

A preferred apparatus of the invention includes a heater power supply 18 for supplying DC electrical power to heating device 16, which can be, for example, a field effect transistor (FET). Heating device 16 is electrically coupled via conductor 20 to heater power supply 18, such that when heater controller 14 supplies a control signal AOS via conductor 22 to an input 24 of heating device 16, heating device 16 responds by conducting current from current input 26 to current output 28 in an amount determined by the voltage of the control signal applied to input 24. Heating device 16 is thermally mounted to an oven 30 of lamp assembly 11 using standard mounting techniques known in the art, and the heat generated by the electrical losses of heating device 16 is transferred to lamp assembly 11 primarily through thermal conduction to oven 30. Oven 30 is preferably a receptacle, such as a brass box, housing lamp assembly 11.

Heater controller 14 includes a bridge circuit 32 which includes a DC source 33, resistors R21 and R22 for generating a reference voltage $V_{REF1}$ and resistor R18 and a temperature sensor 34, preferably a thermistor, for generating a temperature signal TS corresponding to a temperature of lamp assembly 11. Resistor 18 is connected in series with thermistor 34, and resistor R21 is connected in series with resistor R22. Thus, resistor R18 and thermistor 34 form a first voltage divider, and resistors R21, R22 form a second voltage divider.

Thermistor 34 of bridge 32 responds to changes in temperature of lamp assembly 34 by proportionally varying its resistance. Thus, a variation in the resistance of thermistor 34 between a terminal 36 and ground 38 affects the voltage drop across thermistor 34 resulting from the voltage divider formed by resistor R18 and thermistor 34, and the temperature signal TS is the voltage drop across thermistor 34. The temperature signal TS is supplied via conductor 40 to integrating amplifier 42 for conditioning.

Series resistors R21 and R22 form a voltage divider to establish reference voltage $V_{REF1}$ at terminal 44. The magnitude of reference voltage $V_{REF1}$ is, of course, dependent upon the values of resistances selected for resistors R21, R22 and the voltage of DC source 33. In preferred embodiments, however, the voltage of reference voltage $V_{REF1}$ is about two volts. Reference voltage $V_{REF1}$ is supplied via conductor 46 to integrating amplifier 42.

The selection of the voltage for V is a tradeoff between the thermistor gain and the self heating of thermistor 34. As $V_{REF1}$ is increased the thermistor gain increases which decreases the temperature errors which are due to both DC current and voltage errors of integrating amplifier 42. This is at the expense of increased power dissipation in thermistor 34, which results in a larger temperature gradient between thermistor 34 and oven 30. This gradient causes an offset between the controlled thermistor temperature and the actual oven temperature. This offset should, however, be substantially stable since the thermistor temperature and the bridge supply voltage are substantially constant. Also, $V_{REF1}$ needs to be within the input common mode range of integrating amplifier 42.

Integrating amplifier 42 effectively minimizes the magnitude of the thermistor error signal required to produce variations in output heating power which result from ambient temperature changes and/or input voltage variations. Integrating amplifier 42 also includes components which are selected to reduce temperature error due to bias and offset currents of the operational amplifier (op-amp) U1 included in amplifier 42 and leakage current of the integrating capacitor 56.

Integrating amplifier 42 amplifies and integrates the voltage difference between $V_{REF1}$ and temperature signal TS to generate an amplified temperature signal ATS based on the temperature of the lamp assembly 11. Op-amp U1 of integrating amplifier 42 has an inverting input 48, a non-inverting input 50 and an output 52. Op-amp U1 is configured as an integrator having an input resistor R23 connected to inverting input 48, an input resistor R24 connected to non-inverting input 50, and a feedback resistor 54 connected in series with a capacitor 56 to form a feedback loop 58 between output 52 and inverting input 48. Preferably, resistors R23 and R24 are chosen to provide equal DC resistance at the two input nodes 48 and 50.

The integrating configuration of integrating amplifier 42 provides a first gain at zero Hertz which is very high (e.g. 20,000 to 100,000) and a second gain, such as, for example, a gain of between 20 and 40, at a frequency above a gain transition frequency of integrating amplifier 42, such as, for example, 0.011 Hertz, above which the gain is substantially constant. The desired transition frequency, however, is chosen to be well below the thermal control loop bandwidth of lamp system 10, such as, for example, 0.02 to 0.03 Hz. The second gain is substantially determined by a ratio formed by a resistance of the feedback resistor 54 divided by a resistance of the input resistor R23 plus one (1). Thus, integrating amplifier 42 generates an amplified temperature signal ATS based on the temperature of the lamp assembly. Thus, the input stage 42 of heater controller 14 enjoys a high gain and high temperature sensitivity with minimal DC temperature error.

Figure 2:
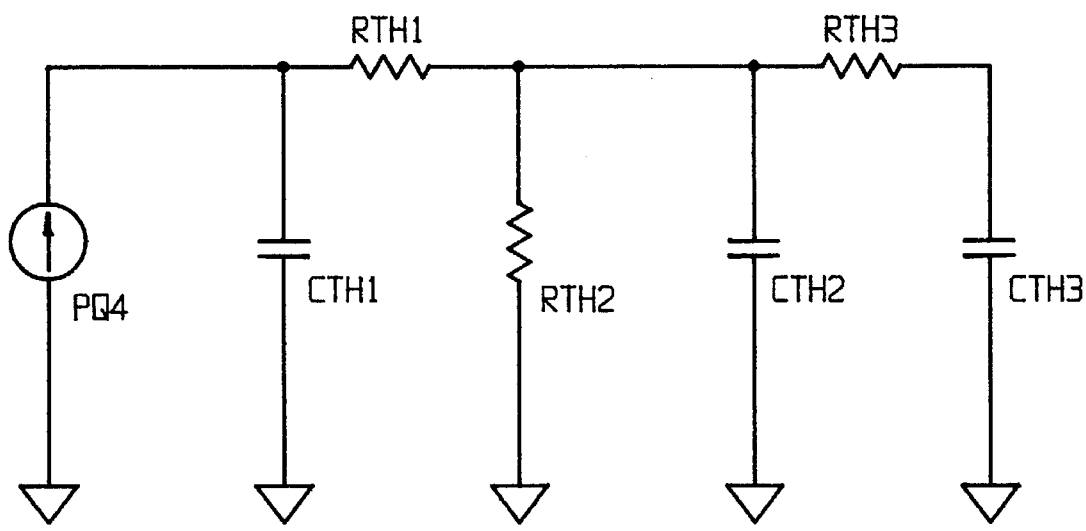
FIG. 2 shows a thermal model schematic of an exemplary lamp system oven being temperature controlled.
Figure 2:
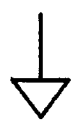

The actual transition frequency and thermal control loop bandwidth of a lamp system are selected to satisfy system stability requirements and are determined by preparing a thermal model of the oven, heating device and thermistor of the lamp system. For example, FIG. 2 shows a thermal model specific to the preferred embodiments of the lamp system 10, and more particularly, to the heating device 16, oven 30 and thermistor 34 of lamp system 10, as shown in FIGS. 1 and 3. The thermal model shown in FIG. 2 includes a thermal resistance RTH1 between heating device 16 and oven 30, a bulk thermal capacity CTH1 of heating device 16, an oven thermal capacity CTH2, a thermal resistance RTH2 from oven 30 to a baseplate (not shown), a thermal resistance RTH3 between thermistor 34 and oven 30, and a thermal capacity CTH3 of thermistor 34. The actual values of these parameters are determined from the characteristics of the components used. As set forth below, Table I shows exemplary values for the above identified parameters, as well as the temperature control specifications, associated with lamp system 10.

TABLE I

| A. THERMAL PARAMETERS | |
|---|---|
| Thermal Resistor (RTH1) | 1.8° C./W |
| Bulk Thermal Capacitor (CTH1) | 0.2J/°C. |
| Oven Thermal Capacity (CTH2) | 5.56J/°C. |
| Thermal Resistance (RTH2) | 50° C./W |
| Thermal Resistance (RTH3) | 150° C./W |
| Thermal Capacity (CTH3) | 0.025J/°C. |
| Thermistor Resistance at 25° C. | 30 kΩ |
| Thermistor Beta | 3810 |
| B. TEMPERATURE CONTROL SPECIFICATIONS | |
| Oven Set Temperature | 110° C. |
| Baseplate Temperature Range | −20TO75° C. |
| Max Time For Oven To Increase Temperature From A −20° TO 110° C. With A −20° C. Baseplate Temperature | 5 MINUTES |

The exemplary values set forth above in Table I result in the above described exemplary thermal bandwidth of 0.02 to 0.03 Hz, which in turn results in a transition frequency of about 0.011 Hz. From this information, the preferred gain above the transition frequency of integrating amplifier 42 is selected to be between about 20 and 40.

Heater controller 14 further includes a receiving circuit or means 60 for receiving the amplified temperature signal ATS from integrating amplifier 42 via conductor 62 and establishes a control output voltage COV at an output 64 having an upper limit based on a voltage of heater power supply 18. Receiving Circuit 60 supplies control output voltage COV to an attenuator 66 via conductor 68.

Attenuator 66 generates an attenuated output signal AOS at output 70 based on the control output voltage COV generated by receiving circuit 60, and signal AOS is supplied via conductor 22 to heating device 16. Attenuator 66 receives a feedback signal AOS2 via conductor 23 from heating device 16. Heating device 16 is controlled so that the voltage of signal AOS2 has the desired attenuation relationship with signal COV.

Attenuator 66 attenuates control output voltage COV by an attenuation factor sufficient to offset a substantial portion of the amplified temperature signal ATS so that the product of the gain of the integrating amplifier multiplied by the attenuation factor reduces the overall gain of the heater controller as required for control loop stability. For example, the gain/attenuation product can be about two or less, so as to provide the gain/attenuation product required for the thermal control loop stability of lamp system 10 at a frequency above the gain transition frequency. The attenuation factor permits a corresponding increase in the gain of integrating amplifier 42 above the gain transition frequency, and the increase in gain can be achieved by decreasing the value of input resistor R23 of integrating amplifier 42. In turn, the reduction in value of input resistor R23 results in a decrease in an amount of DC temperature error generated by heater controller 14, wherein the DC temperature error is a result of leakage currents through capacitor 56 at elevated temperatures and the offset currents associated with op-amp U1. Thus, heater controller 14 reduces the sensitivity to leakage currents and offset currents in the heater controller, thereby reducing or eliminating the temperature error problems resulting from the elevated temperature environment surrounding the heater controller components, e.g. 85° C.

The amount of DC temperature error can be approximated by the formula:

Temperature Error=[(i offset+iCR leakage) R23+$V_{o6}$] 1/k1, wherein: i offset is the offset current of op-amp U1;

iCR leakage is the leakage current associated with capacitor 56

R23 is the input resistance value of resistor R23;

$V_{o6}$ is the offset voltage of op-amp U1; and k1 is the gain of thermistor 34 in volts per degree C. Thus, a decrease in the resistance of R23 results in a reduction of temperature error.

The overall gain of heater controller 14 above the gain transition frequency could be reduced by decreasing the feedback resistance rather than by using attenuator 66, which may initially appear as an alternative. However, to maintain the same gain transition frequency the feedback capacitance would need to be increased proportionally, which would increase the area required for the capacitive components as well as increase the capacitor leakage current. Where high quality op-amps having low input bias currents are used, the capacitor leakage current is the dominant DC current error and, thus, there would be a large degradation in temperature accuracy if such an alternative approach was taken.

In addition, the attenuation factor of attenuator 66 allows thermistor bridge 32 to operate at a higher gain (in millivolts per degrees C of control temperature).

As shown in FIG. 1, receiving circuit 60 includes a compensating circuit 72 and a voltage follower circuit 74. Compensating circuit 72 compensates for variations in the output of heater power supply 18 and provides a voltage compensated output 76 which is coupled via conductor 78 to an input 80 of voltage follower circuit 74. Since the output voltage of heater power supply 18 is applied to heating device 16, any variation in the heater power supply output voltage will directly affect the power loss and heat generated by heating device 16 (voltage times current). Compensating circuit 72 senses the voltage of heater power supply 18 via conductor 81 and compensates for variations in the voltage output of heater power supply 18 by generating a clamp voltage CV based on the voltage generated by heater power supply 18. The clamp voltage CV is then used to establish a settable upper limit for the control output voltage COV, and is chosen to be close to the positive rail of integrating amplifier 42 to limit the increase of current through heating device 16 as the voltage of heater power supply 18 drops below a predetermined amount, such as for example, 18 volts. Voltage follower circuit 74 includes a second input 82 for receiving the amplified temperature signal ATS via conductor 62 from integrating amplifier 42. Voltage follower circuit 74 also includes a following output 64, corresponding to output 64 of receiving circuit 60, for supplying the control output voltage COV at a voltage level which substantially tracks the voltage of the amplified temperature signal ATS, provided voltage follower circuit 74 is not controlled by integrating amplifier 42 to operate in saturation, as is the case during start up. Voltage follower circuit 74, however, supplies the control output voltage COV at a maximum voltage substantially equal to the clamp voltage CV when voltage follower circuit 74 reaches saturation, as is the case during start up.

Compensating circuit 72 adjusts the clamp voltage CV applied to input 80 of voltage follower circuit 74 as the voltage applied by heater power supply 18 to heating device 16 varies. For example, the output of heater power supply 18 may vary from a low voltage of about 18 V or less to and above a high voltage of about 32 V. Thus, compensating circuit 72 adjusts the clamp voltage CV so that at each value of current through heating device 16, the thermal loss of heating device 16 remains substantially constant at each value of current through heating device 16 throughout the voltage range, such as for example, about 18 to about 32 volts. Still further, compensating circuit 72, through clamp voltage CV, provides protection for heating device 16 during overload and spike conditions by substantially turning off heating device 16 at heater power supply voltages approaching a predetermined maximum value, such as for example, 50 V. In addition, compensating circuit 72 stops increasing current through heating device 16 when the voltage of heater power supply 18 drops below a predetermined amount, such as 18 volts, so as to aid in the power-up of heating device 16 by reducing the in-rush current requirements of heating device 16.

Figure 3A:
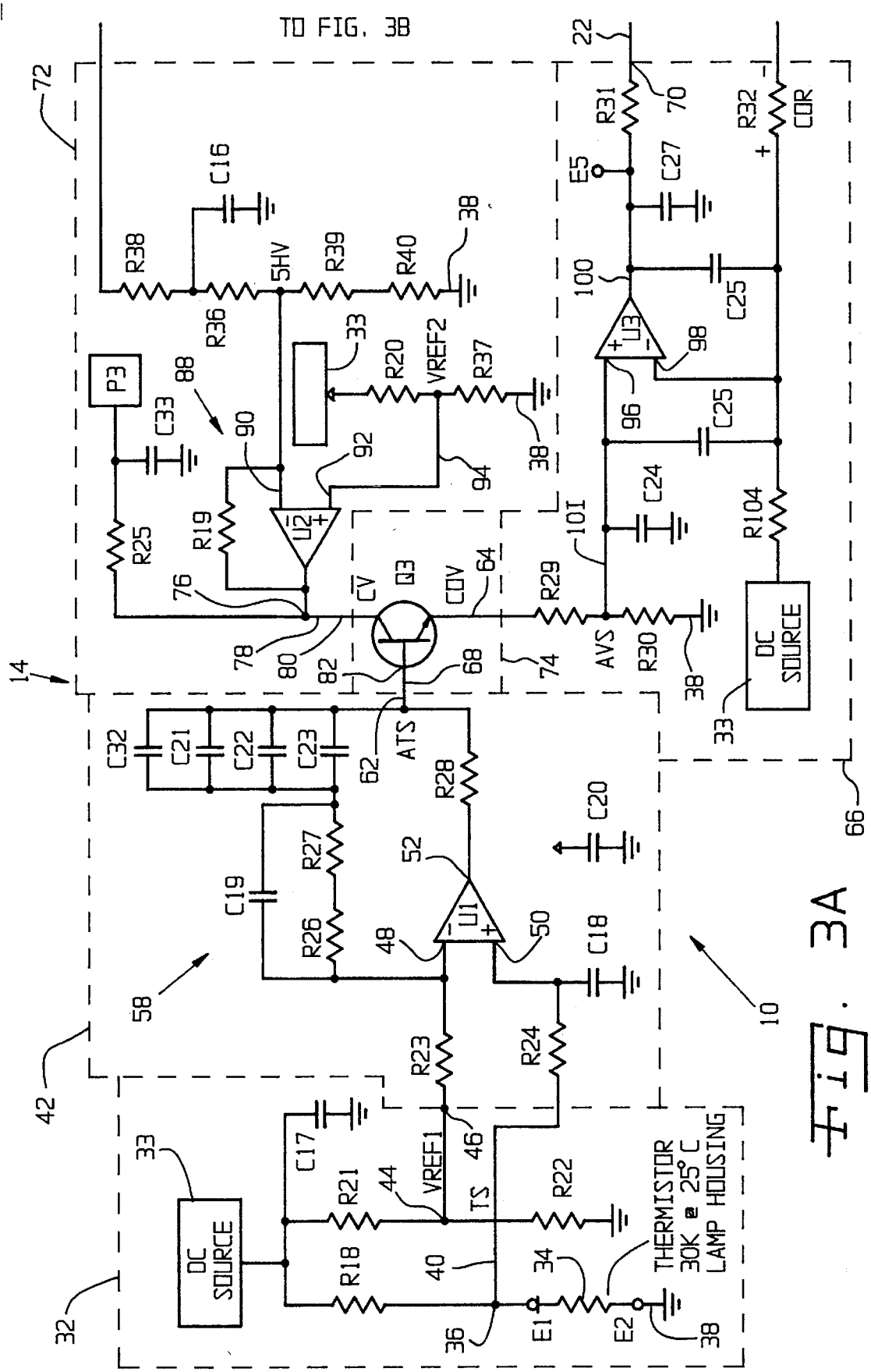
FIGS. 3A and 3B show a schematic diagram of a heater controller of the lamp system of FIG. 1.
Figure 3B:
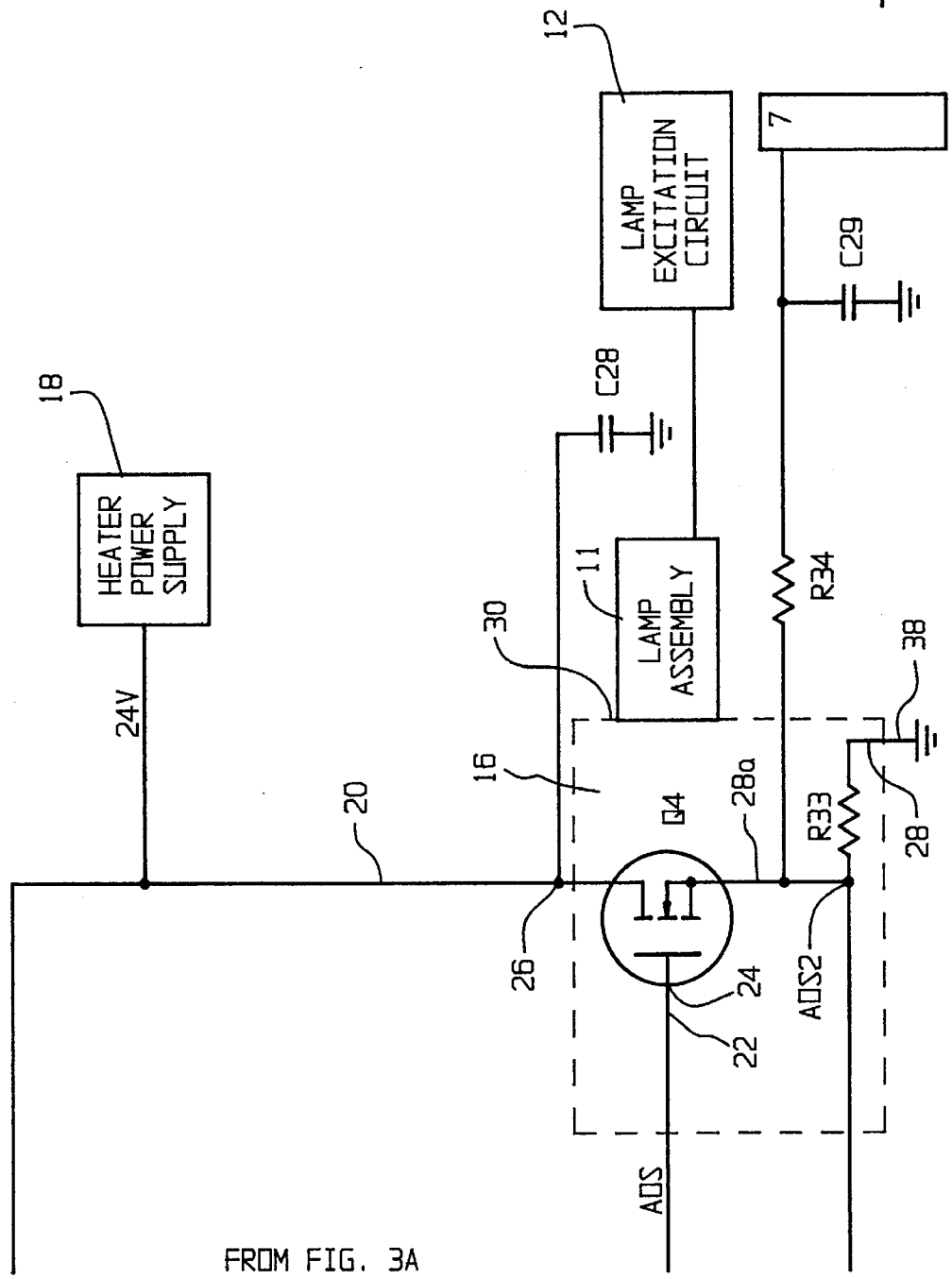

FIGS. 3A and 3B show a preferred schematic diagram of heater controller 14 shown in FIG. 1. Heater controller 14 includes heating device 16, bridge circuit 32, integrating amplifier 42, compensating circuit 72, voltage follower circuit 74 and attenuator 66, which operate and interact as described above to provide accurate and stable temperature control for lamp assembly 11 by regulating a current flow through heating device 16 so as to maintain a substantially constant heating power output, while reducing the DC temperature error of heater controller 14.

As shown in FIG. 3B, a nominally 24 volt heater power source 18 supplies DC electrical power via conductor 20 to heating device 16. Heating device 16 includes a heater transistor (FET) Q4 having its drain 26 coupled via conductor 20 to heater power source 18 and having its source 28a coupled to ground 38 via resistor R33.

Heater FET Q4 is controlled such that when heater controller 14 supplies a control signal via conductor 22 to gate 24 of heater FET Q4, heater FET Q4 responds by conducting current from drain 26 to current output 28 (conventional current flow) in the amount necessary to yield a voltage, labeled AOS2, at the current output node 28a. The AOS2 signal is the feedback signal to the attenuator block used to establish the transfer function from the AVS signal to the AOS2 signal via a local control loop with op-amp U3 as the high gain block.

Heater FET Q4 is thermally mounted to oven 30 of lamp assembly 11 using standard heat transfer mounting techniques known in the art, and the heat generated by the electrical losses of heater FET Q4 is transferred to lamp assembly 11, primarily through thermal conduction to oven 30.

Heater controller, as shown in FIG. 3A, includes a bridge circuit 32, which includes a DC source 33 having an output voltage, for example of 14.6 volts, resistors R21 and R22 for generating a reference voltage $V_{REF1}$ and resistor R18 and a temperature sensor 34, preferably a thermistor, for generating a temperature signal TS corresponding to a temperature of lamp assembly 11. Resistors R18, R21, and R22 are each high precision resistors having a preferred tolerance of 0.1 percent. Resistor 18 is connected in series with thermistor 34, and resistor R21 is connected in series with resistor R22. Thus, resistor R18 and thermistor 34 form a first voltage divider, and resistors R21, R22 form a second voltage divider.

Thermistor 34, preferably having a resistance of 30 k ohms at 25 degrees C., responds to changes in temperature of lamp assembly 11 by varying its resistance. Resistor R18 has a preferred fixed resistance of 10.0 k ohms. Thus, a variation in the resistance of thermistor 34 between terminal 36 and ground 38 affects a voltage drop across thermistor 34 resulting from the voltage divider formed by resistor R18 and thermistor 34. In turn, the temperature signal TS is equal to the voltage drop across thermistor 34. The temperature signal TS is supplied via conductor 40 to integrating amplifier 42 for conditioning.

Series resistors R21 and R22, having resistance values of 61.9 k ohms and 9.53 k ohms, respectively, form a voltage divider to establish reference voltage $V_{REF1}$ at terminal 44. Assuming the voltage of voltage source 33 is 14.6 volts, then the voltage of reference voltage $V_{REF1}$ is about 1.94 volts. Reference voltage $V_{REF1}$ is supplied via conductor 46 to integrating amplifier 42.

Integrating amplifier 42 amplifies and integrates the voltage difference between $V_{REF1}$ and temperature signal TS to generate an amplified temperature signal ATS based on the temperature of the lamp assembly 11. Integrating amplifier 42 includes op-amp U1 having an inverting input 48, a non-inverting input 50 and an output 52. Op-amp U1 is configured as an integrator having an input resistor R23 connected to inverting input 48, an input resistor R24 connected to non-inverting input 50, and an output resistor R28 connected connected to output 52. Feedback circuit 58 coupled between output 52 and inverting input 48 of op-amp U1, and shown in simplified form in FIG. 1 as including resistor 54 and capacitor 56, includes parallel capacitors C32, C21, C22, C23 coupled in series with the a parallel combination formed by series resistors R26, R27 and capacitor C19. Preferably, resistors R23 and R24 have equal resistances of 1.00M ohms, resistors R26, R27 each have equivalent resistances of 18M ohms, capacitor C19 has a capacitance of 4.7 pico farads, and capacitors C32, C21, C22, C23 each have equivalent capacitances of 0.1 micro farads.

The integrating configuration of integrating amplifier 42 provides a first gain at zero Hertz which is very high (e.g. 20,000 to 100,000) and a second gain of about 37 at a frequency above a gain transition frequency of integrating amplifier 42, such as, for example 0.011 Hertz. The second gain is substantially determined by a ratio formed by a resistance of the feedback resistors R26, R27 divided by a resistance of the input resistor R23, plus one (1), [((R26+R27)/R3)+1].

Heater controller 14 further includes a voltage follower circuit 74 formed by a bipolar control transistor Q3 having a collector 80, a base 82 and an emitter 64. Base 82 of transistor Q3 is connected via conductor 68 to integrating amplifier 42 for receiving the amplified temperature signal ATS. Collector 80 is connected to compensating circuit 72. Emitter 64 is connected to attenuator 66. Control transistor Q3 responds to the amplified temperature signal ATS by establishing a control output voltage COV at emitter 64 having an upper limit based on a voltage of heater power supply 18. Voltage follower circuit 74 and compensating circuit 72 of FIG. 3 comprise the receiving circuit or means 60 of FIG. 1.

Compensating circuit 72 includes an output 76 which is coupled via conductor 78 to collector 80 of control transistor Q3. Compensating circuit 72 compensates for variations in a voltage output of heater power supply 18 by generating a clamp voltage CV based on a voltage generated by heater power supply 18, wherein the clamp voltage CV is used to establish the upper limit for the control output voltage COV. Control transistor Q3 receives the amplified temperature signal ATS via conductor 68 from integrating amplifier 42, and generates and supplies control output voltage COV at a voltage level which substantially tracks the voltage of the amplified temperature signal ATS, provided that control transistor Q3 is not forced into saturation by integrating amplifier 42, and when control transistor Q3 is forced into saturation by integrating amplifier 42, control transistor Q3 supplies the control output voltage COV at a maximum voltage substantially equal to the clamp voltage CV. The output resistor R28 of integrating amplifier 42 maintains the voltage at the base of control transistor Q3 at substantially the clamp voltage CV plus the base to emitter voltage of Q3 (e.g. ≈0.6 volts) when Q3 is in saturation. Thus, even though control transistor Q3 is arranged in relation to attenuator 66 to operate as a voltage follower, the control output voltage COV can never be higher than the clamp voltage CV, regardless of the temperature signal TS.

Compensating circuit 72 adjusts the clamp voltage CV applied to collector 80 of control transistor Q3 as the voltage applied by heater power supply 18 to heater FET Q4 varies, for example, from a low voltage of about 18 V to and above a high voltage of about 32 V, so that at each value of voltage, the current through heater FET Q4 makes a single straight line approximation to that current required for a constant thermal loss of heater FET Q4 throughout the voltage range of about 18 to about 32 volts, through the action of compensating circuit 72, control transistor Q3 and attenuator 66.

Compensating circuit 72 includes a differential amplifier 88, including an op-amp U2 having an output 76, an inverting input 90, and a non-inverting input 92. A feedback resistor R19 is connected between output 76 and inverting input 90. A reference voltage $V_{REF2}$ is applied to non-inverting input 92 via conductor 94. $V_{REF2}$ is generated through a voltage divider formed by series resistors R20, R37 coupled between the 14.6 volt source 33 and ground 38. Preferably, resistor R20 has a resistance of 16.2k ohms and resistor R37 has a resistance of 100k ohms. Accordingly, the voltage divider formed by resistors R20, R37 result in a voltage for $V_{REF2}$ of about 11.75 volts.

Compensating circuit 72 samples the voltage of heater power supply 18 via a voltage divider formed by series resistors R38, R36, R39, and R40 having preferred resistances of 51.1k, 3.92k, 100k and 3.01k ohms, respectively, thereby generating a sampled heater open circuit voltage signal SHV which, based upon a heater supply voltage of 24 volts, is about 15.64 volts. Differential amplifier 88 amplifies the difference between the sampled heater open circuit voltage SHV and the reference voltage Vm to generate the clamp voltage CV. Based upon the component values set forth above, the inverting side of differential amplifier 88 has a gain of about −0.56 and the non-inverting side of differential amplifier 88 has a gain of about 1.56, resulting in a clamp voltage CV, based upon the component values and voltages set forth above, of about 9.6 volts. Thus, when heater power source is at 24 volts, then control output voltage can be no more then the clamp voltage of about 9.6 volts. The actual value for clamp voltage CV, however, depends upon the actual voltage generated by heater power supply 18, and varies accordingly, to compensate for the actual value of the voltage of heater power supply 18 at any given time.

Attenuator 66 generates the attenuated output signal AOS based on the control output voltage COV present at the emitter 64 of control transistor Q3. Attenuator 66 attenuates the control output voltage COV by an attenuation factor sufficient to offset a substantial portion of the amplified temperature signal ATS so that the product of the gain of the integrating amplifier multiplied by the attenuation factor is about two or less as required for thermal control loop stability at a frequency above the gain transition frequency. For example, at above a gain transition frequency of about 0.011 Hertz, integrating amplifier 42 has a gain of 37, as determined by the equation, 1+[(R26+R27)÷R23], and attenuator 66 has an attenuation factor of 0.0414, as determined by the equation R30÷(R29+R30). The result of multiplying the gain of integrating amplifier 42 by the attenuation factor of attenuator 66 is an overall gain of about 1.53, as deemed ideal with the thermal model used, as shown in FIG. 2.

Therefore, the overall decrease in gain that attends the attenuation factor of attenuator 66 permits a corresponding increase in the gain of integrating amplifier 42 above the gain transition frequency, and this increase in gain permitted in integrating amplifier 42 can be achieved by decreasing the value of input resistor R23 of integrating amplifier 42. The resulting reduction in value of input resistor R23 results in a decrease in an amount of DC temperature error generated by heater controller 14. As set forth above, the DC temperature error is dominated by leakage currents through capacitors C19, C32, C21, C22, and C23 at elevated temperatures and the offset and bias currents associated with op-amp U1.

The overall gain of heater controller 14 above the transition frequency could be reduced by decreasing the feedback resistance rather than by using attenuator 66, which may initially appear as an alternative. However, to maintain the same gain transition frequency the feedback capacitance would need to be increased proportionally, which would increase the area required for the capacitive components, as well as increase the capacitor leakage current. Where high quality op-amps having low input bias currents are used, the capacitor leakage current is the dominant DC current error and, thus, there would be a large degradation in temperature accuracy if such an alternative approach was taken.

As shown in FIG. 3A, attenuator 66 includes a pair of series connected resistors R29, R30 coupled between the following output 64 of control transistor Q3 and ground 38. The voltage divider effect of resistors R29, R30 generate an attenuated voltage signal AVS which is proportional to the voltage of control output voltage COV. Attenuator 66 further includes a buffer op-amp U3 having a non-inverting input 96, an inverting input 98 and an output 100. Non-inverting input 96 is coupled between the pair of series resistors R29, R30 via conductor 102, and receives the attenuated voltage signal AVS therefrom. Inverting input 98 is coupled via resistor R32 to the source 28a of heater FET Q4, which in turn is coupled via resistor R33 to ground. Output 100 is coupled via resistor R31 and conductor 22 to the gate 24 of heater FET Q4 and controls the attenuated output signal AOS to control the current flow through heater FET Q4.

Attenuator 66 further includes the reference voltage source 33 coupled via a resistor R104 to the inverting input 98 of the buffer op-amp U3. The reference voltage, along with resistors R104 and R32 generate a correction voltage COR across R32 which, when applied to inverting input 98 of op-amp U3, overrides a voltage offset of the inputs 96, 98 of buffer op-amp U3 and allows the amplifier U1 to control the current through heating device 16 down to zero amps without U1 needing an output voltage swing capability down to zero volts, and/or without requiring the base-to-emitter forward voltage drop of transistor Q3 to be within the output voltage range of integrating amplifier 42.

The buffer op-amp U3 serves as a buffer having an extremely high input impedance which controls the gate 24 of FET Q4 to the extent required to make the current output 28a of FET Q4 generate a voltage, AOS2, across R33 which is equal to AVS minus COR.

During start-up, (i.e. the start mode) the attenuated voltage signal AVS tracks the control output voltage COV, and the attenuated output signal AOS controls the operation of heater FET Q4 to establish and maintain a substantially constant power dissipation throughout a range of variation in the voltage of heater power supply 18 of, for example, from 18 to 32 volts DC and above.

After start-up (i.e the temperature regulation mode) the attenuated voltage AVS tracks the control output voltage COV, and the attenuated output signal AOS controls the operation of the heater FET Q4 to establish and maintain the heater power required to regulate the oven temperature.

Accordingly, the invention, as set forth above, provides accurate and stable temperature control for a physics package, such as lamp assembly 11. When there are large temperature errors, such as at start-up, heater controller 14 substantially regulates the power applied to heater FET Q4. As the steady state temperature is approached, the heating power is reduced to a level which will sustain the steady state temperature with a minimal temperature error. Heater controller 14 will then adjust the heating power to compensate for environmental variations, such as baseplate temperature and input heater power supply voltage variations, so as to maintain a substantially constant oven temperature.

Although the invention has been described with reference to preferred embodiments, those skilled in the art will recognize that changes may be made in form and in detail without departing from the spirit and scope of the following claims.

What is claimed is:

1. An apparatus for regulating the temperature of an assembly in an atomic frequency standard, comprising:

power supply means for supplying DC electrical power;

a heating device electrically coupled to said power supply means and thermally coupled to said assembly whereby electrical losses of said heating device heat said assembly;

means for generating a temperature signal corresponding to a temperature of said assembly;

means for conditioning said temperature signal, said means including an integrating amplifier having an input resistor, a feedback resistor and a feedback capacitor, said integrating amplifier having a very large first gain at zero Hertz and having a second gain at a frequency above a gain transition frequency which is substantially determined by the formula: (Feedback Resistance/Input Resistance)+1 said integrating amplifier generating an amplified temperature signal based on said temperature;

means for receiving said amplified signal;

means for attenuating an output signal from said receiving means by an attenuation factor sufficient to offset a substantial portion of said amplified temperature signal so that the gain of said integrating amplifier multiplied by said attenuation factor is that value required for thermal control loop stability at a frequency above said gain transition frequency, and wherein said attenuation factor permits an increase in the gain of said integrating amplifier above said transition frequency, said increase in gain being achieved by decreasing the value of said input resistor of said integrating amplifier, said reduction in value of said input resistor resulting in a decrease in an amount of DC temperature error generated by said temperature signal conditioning means; and said heating device being responsive to said attenuated output signal for controlling a current flow therethrough.

2. The apparatus of claim 1, wherein said DC temperature error is a result of leakage currents and offset currents flowing in said integrating amplifier.

3. The apparatus of claim 1, wherein said means for generating a temperature signal comprises a thermistor bridge circuit having a thermistor thermally coupled to said assembly for generating a voltage signal corresponding to a temperature of said assembly.

4. The apparatus of claim 1, wherein said means for receiving said amplified signal establishes a control voltage having a settable upper limit.

5. The apparatus of claim 1, wherein said means for receiving said amplified signal establishes a control voltage having an upper limit based on a voltage of said power supply means.

6. The apparatus of claim 5, wherein said receiving means comprises:

means for compensating for voltage variations in said power supply means by generating a clamp voltage based on a voltage generated by said power supply means, said clamp voltage establishing said upper limit of said control voltage; and a voltage follower circuit having an input for receiving said amplified temperature signal and a following output for supplying said control voltage at a voltage level which substantially tracks the voltage of said amplified temperature signal while said voltage follower is not controlled to operate in saturation, said control voltage having a maximum voltage substantially equal to said clamp voltage when said voltage follower circuit reaches saturation.

7. The apparatus of claim 6, wherein said compensating means comprises a compensating amplifier having a first input coupled to said power supply means and a second input coupled to a reference voltage, wherein said compensating amplifier generates said clamp voltage based on a difference in voltage levels present at said first and second inputs.

8. The apparatus of claim 7, wherein said voltage follower circuit comprises a control transistor having a collector connected with said output of said compensating amplifier, said compensating amplifier adjusting the collector voltage of said control transistor as said voltage applied to said heating device varies, whereby at each value of voltage, the current through said heating device makes a single straight line approximation to that current required for a constant thermal loss of said heating device as said voltage applied to said heating device varies.

9. The apparatus of claim 8, wherein said compensating amplifier adjusts the collector voltage of said control transistor as said voltage applied to said heating device varies in a voltage range from a low voltage of about 18 volts to a high voltage of about 32 volts, whereby at each value of voltage, the current through said heating device makes a single straight line approximation to that current required for a constant thermal loss of said heating device throughout said voltage range, through the action of said compensating amplifier, said control transistor and said attenuating means.

10. The apparatus of claim 6, wherein said attenuating means comprises:

a pair of series connected resistors coupled between said following output and ground; and a buffer op-amp having a non-inverting input coupled between said pair of series resistors, having an inverting input coupled to said heating device, and an output for supplying a signal to control said current flow through said heating device.

11. The apparatus of claim 10, wherein said attenuation means further comprises a voltage reference circuit resistively coupled to said inverting input of said buffer op-amp, said voltage reference circuit generating a signal having a voltage which overrides a voltage offset of said inputs of said buffer op-amp and to permit fuller range of operation of said buffer op-amp, and allows said integrating amplifier to control the current through said heating device down to zero amps without said integrating amplifier needing an output voltage swing down to zero volts.

12. The apparatus of claim 1 wherein said heating device is a field effect transistor.

13. A regulated heater for a assembly, comprising:

a heater power source;

a heater transistor electrically coupled to said heater power source and thermally coupled to said assembly whereby electrical losses of said semiconductor device heat said assembly;

a thermistor bridge circuit having a thermistor thermally coupled to said assembly for generating a voltage signal corresponding to a temperature of said assembly;

an integrating amplifier having an input resistor, a feedback resistor and a feedback capacitor, said integrating amplifier having a first gain at zero Hertz of about 20,000 or greater and having a second gain at a frequency above a gain transition frequency which is substantially determined by a ratio formed by a resistance of said feedback resistor divided by a resistance of said input resistor, said integrating amplifier generating an amplified temperature signal based on said temperature of said assembly;

a control transistor having a control input, a current input, and a controlled output, said control input being coupled to an output of said integrating amplifier circuit;

a clamp circuit for generating a DC voltage limit based upon a voltage of said heater power source, said DC voltage limit being applied to said current input of said control transistor for establishing a maximum voltage at the controlled output of said control transistor which is substantially equal to said DC voltage limit when said control transistor is controlled to operate in saturation;

an attenuator circuit having an input coupled to said controlled output of said control transistor, said attenuator circuit attenuating said voltage at said controlled output of said control transistor by an attenuation factor sufficient to offset a substantial portion of said amplified temperature signal, wherein a product of the gain of said integrating amplifier multiplied by said attenuation factor is about two or less as required for thermal control loop stability at a frequency above said gain transition frequency, and wherein said attenuation factor permits an increase in the gain of said integrating amplifier above said gain transition frequency, said increase in gain being achieved by decreasing the value of said input resistor of said integrating amplifier, said reduction in value of said input resistor resulting in a decrease in an amount of DC temperature error generated by said assembly; and a heater transistor coupled to an output of said attenuator circuit.

14. The apparatus of claim 13, wherein said DC temperature error is a result of leakage currents and offset currents flowing in said integrating amplifier.

15. The apparatus of claim 13, wherein said clamp circuit comprises a compensating amplifier having a first input coupled to said power supply means and a second input coupled to a reference voltage, wherein said compensating amplifier generates said clamp voltage based on a difference in voltage levels present at said first and second inputs.

16. The apparatus of claim 15, wherein said control transistor includes a collector connected with said output of said compensating amplifier, said compensating amplifier adjusting the collector voltage of said control transistor as said voltage applied to said heating device varies from a low voltage of about 18 V to and above a high voltage of about 32 V, whereby at each value of voltage, the current through said heating device makes a single straight line approximation to that current required for a constant thermal loss of said heating device throughout the voltage range of about 18 to about 32 volts, through the action of said compensating amplifier, said control transistor and said attenuator circuit.

17. The apparatus of claim 13, wherein said attenuator circuit comprises:

a pair of series connected resistors coupled between said controlled output and ground;

a buffer op-amp having a non-inverting input coupled between said pair of series resistors, having an inverting input coupled to said heater transistor, and an output for supplying a signal to control said current flow through said heater transistor; and a voltage reference circuit resistively coupled to said inverting input of said buffer op-amp, said voltage reference circuit generating a signal having a voltage which overrides a voltage offset of said inputs of said buffer op-amp to permit fuller range of operation of said buffer op-amp and allows the integrating amplifier to control the current through said heater transistor down to zero amps without said integrating amplifier needing an output voltage swing capability down to zero volts.

18. A regulated heater for a lamp assembly, comprising:

a semiconductor device connected with a heater supply voltage, with an output signal resistor, and with the output of a precision attenuator circuit, said semiconductor device being thermally coupled to said lamp assembly whereby electrical losses of said semiconductor device heat said lamp assembly;

said precision attenuator circuit comprising a op-amp having its negative input connected with said output signal resistor and a constant small offset compensation voltage, and having its positive input connected with a control voltage attenuator, said control voltage attenuator being connected with a heater supply voltage-compensating, temperature control circuit comprising a clamping semiconductor whose output drives said control voltage attenuator and compensates for heater supply voltage variations, said clamping semiconductor being connected with said heater supply voltage through a heater supply voltage compensator circuit; and a temperature controller op-amp having its output connected through a selected resistance with the input of said clamping semiconductor, one of its inputs being connected with a temperature sensor for said lamp assembly temperature, and the other of its inputs being connected with a reference signal and transfer function feedback means for providing stable control of the temperature of said lamp assembly, whereby the output of the temperature controller op-amp provides an electrical loss control signal through said selected resistance and clamping semiconductor to said control voltage attenuator, said heater-supply voltage-compensating circuit adjusting the voltage of said clamping semiconductor to compensate for variations in the heater supply voltage.

19. The regulated heater of claim 18, wherein at high heater supply voltages said clamping semiconductor, and selected resistance operate to clamp said control voltage attenuator substantially to a reduced voltage output of said heater voltage compensator circuit during maximum heating conditions.

20. A temperature controller for a lamp assembly of an atomic frequency standard, comprising:

a field effect transistor connected with a heater supply voltage and thermally coupled to said lamp assembly whereby the thermal loss of said field effect transistor resulting from the product of the current through and voltage across said field effect transistor heats said lamp assembly;

a thermistor temperature sensor thermally coupled to said lamp assembly to sense the temperature thereof; and a control circuit for controlling the thermal loss of said field effect transistor in response to said thermistor temperature sensor, said control circuit comprising a first op-amp having an output for controlling the thermal loss of said field effect transistor, having a first input connected with said thermistor temperature sensor, and having a second input connected through an input resistance with a temperature control reference and with frequency responsive feedback components from said output, said frequency responsive feedback components including a resistive component providing with said input resistance a gain substantially greater than 20 at frequencies larger than a gain transition frequency and a capacitive component providing with said resistive component and input resistance said gain transition frequency of less than a value determined by a thermal model to satisfy stability requirements, said output of said first op-amp being connected through a selected resistance with the base of a control transistor, the emitter circuit of said control transistor including a control voltage attenuator connected in a precision attenuator circuit having an attenuation factor, which when multiplied by the gain of said first op-amp, results in a circuit gain having a value determined by a thermal model to satisfy stability requirements, the collector of said control transistor being connected with a voltage compensating circuit, said voltage compensating circuit adjusting the collector voltage of said control transistor as said voltage applied to the field effect transistor varies from a low voltage range of about 18 V to and above a high voltage range of about 32 V, whereby at each value of voltage, the current through said field effect transistor makes a single straight line approximation to that current required for a constant thermal loss of said field effect transistor throughout the voltage range of about 18 to about 32 volts, through the action of said voltage compensating circuit, said control transistor and said control voltage attenuator, said precision attenuator circuit comprising a second op-amp having one input connected with said control voltage attenuator and having the other input connected, via a control resistor, to an output of said field effect transistor and with a resistance-coupled low voltage to override the voltage offset of said inputs of said second op-amp and to permit fuller range of operation of said first op-amp, and allowing said integrating amplifier to control the heater device current to zero current without requiring zero volts plus the base to emitter forward voltage drop of the said control transistor to be within the output voltage range of said integrating amplifier, said precision attenuator thereby permitting a stable, wide-range of operation of said control circuit.

21. A method of reducing temperature errors in a lamp assembly having a regulating heater controllably receiving electrical power from a heater power supply, comprising the steps of:

generating a temperature signal based upon an output of a temperature sensing device;

conditioning said temperature signal with an integrating amplifier having an input resistor, a feedback resistor and a feedback capacitor, said integrating amplifier having a first gain at zero Hertz of greater than about 20,000 and having a second gain at a frequency above a gain transition frequency determined substantially by the formula: (Feedback Resisting/Input Resistance)+1, said integrating amplifier generating an amplified temperature signal based on said temperature;

supplying said amplified signal to a voltage follower circuit having a clamped voltage limit based on a voltage generated by said heater power supply;

attenuating an output of said voltage follower circuit by an attenuation factor sufficient to offset a substantial portion of said amplified temperature signal so that the gain of said integrating amplifier multiplied by said attenuation factor is about two or less as required for thermal control loop stability at a frequency above said gain transition frequency, and wherein said attenuation factor permits an increase in the gain of said integrating amplifier above said gain transition frequency, said increase in gain being achieved by decreasing the value of said input resistor of said integrating amplifier, said reduction in value of said input resistor resulting in a decrease in an amount of DC temperature error generated by said lamp assembly; and applying heat to said lamp assembly based on said attenuated Output signal.

22. An apparatus for regulating the temperature of an element of an atomic frequency standard, comprising:

a power supply for supplying DC electrical power;

a heating device electrically coupled to said power supply means and thermally coupled to said element for heating said element;

a temperature sensor for generating a temperature input signal corresponding to a temperature of said element;

an integrating amplifier having an input resistor connected with said temperature input signal, a feedback resistor and a feedback capacitor, said integrating amplifier having a very large first gain at zero Hertz and having a second gain at a frequency above a gain transition frequency which is substantially determined by the formula: (Feedback Resistance/Input Resistance)+1, said integrating amplifier generating an amplified output signal based on said temperature input signal; and an attenuating interconnection having as an input said amplifier output signal and providing as an output a heating device control signal, said attenuating interconnection having an attenuation factor sufficient to offset a substantial portion of said amplified output signal so that the gain of said integrating amplifier multiplied by said attenuation factor is that value required for thermal control loop stability at a frequency above said gain transition frequency, said attenuation factor permitting an increase in the gain of said integrating amplifier above said transition frequency by decreasing the value of said input resistor of said integrating amplifier, resulting in a decrease in an amount of DC temperature error generated by said integrating amplifier, and said heating device being responsive to said heating device control signal for controlling the temperature of said element.

* * * * *